(No Model.) 2 Sheets—Sheet 1.

H. LEMP.
SLIDING CLAMP FOR ELECTRIC WELDING APPARATUS.

No. 428,616. Patented May 27, 1890.

WITNESSES:
J. Hurdle
Wm. H. Capel

INVENTOR
Hermann Lemp
BY
H. C. Townsend
ATTORNEY

THE NORRIS PETERS CO., PHOTO-LITHO., WASHINGTON, D. C.

(No Model.) 2 Sheets—Sheet 2.

H. LEMP.
SLIDING CLAMP FOR ELECTRIC WELDING APPARATUS.

No. 428,616. Patented May 27, 1890.

WITNESSES:

INVENTOR
Hermann Lemp
BY
H. C. Townsend
ATTORNEY

UNITED STATES PATENT OFFICE.

HERMANN LEMP, OF LYNN, MASSACHUSETTS, ASSIGNOR TO THE THOMSON ELECTRIC WELDING COMPANY, OF MAINE.

SLIDING CLAMP FOR ELECTRIC WELDING APPARATUS.

SPECIFICATION forming part of Letters Patent No. 428,616, dated May 27, 1890.

Application filed August 8, 1889. Serial No. 320,182. (No model.)

*To all whom it may concern:*

Be it known that I, HERMANN LEMP, a citizen of the United States, and a resident of Lynn, in the county of Essex and State of Massachusetts, have invented certain new and useful Sliding Clamps for Welding Apparatus, of which the following is a specification.

My invention relates to that part of an electric welding or metal-working apparatus which holds the piece or pieces of metal to be heated by the electric current, and which is made movable for the purpose of pressing the piece held toward another piece, or for other purpose, as in forging, upsetting, riveting, or other operations. In this class of apparatus, especially when used for welding operations, the clamp-slide must not only be mounted so that electric current may pass freely between it and its supporting-bed, but it must also be accurately guided.

The object of my invention is to overcome certain practical difficulties found to exist in the use of the present method of mounting and guiding clamp-slides, while at the same time permitting the slide to be made without requiring a high grade of skilled labor; and to this end my invention consists in the peculiar constructions and details, to be hereinafter more fully described in connection with the accompanying drawings, and then specified in the claims.

In electric welding and similar apparatus the large volume and the low electro-motive force of the heating electric current make it necessary not only that the supporting-posts which carry the work and convey current thereto should be of some good conductor, but also that the clamp-slide and its bed should be of low resistance. It is also of the greatest importance, especially with small work or with work which fuses readily or becomes very soft at welding temperature, that the clamp-slide should move with freedom, and further that it should be guided or held against lateral movement, in order that the parts of the work may be kept in line.

Figure 1:
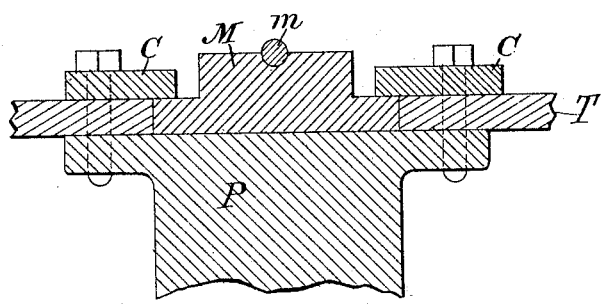
Figure 2:
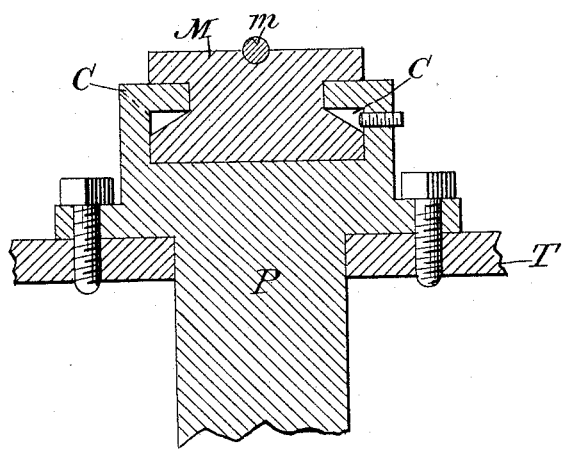
Figure 3:
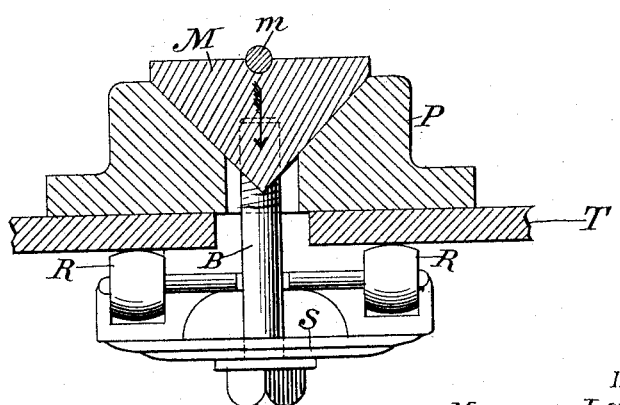
Figure 4:
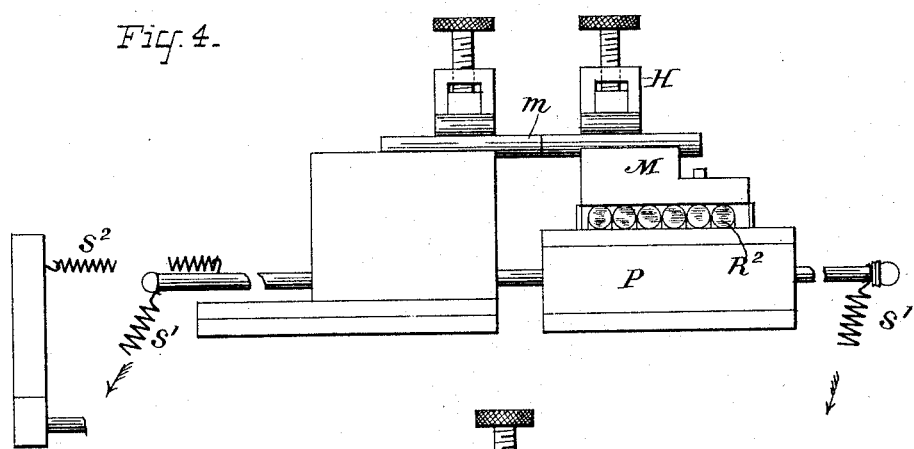
Figure 5:
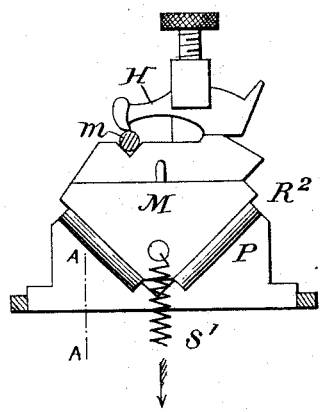
Figure 6:
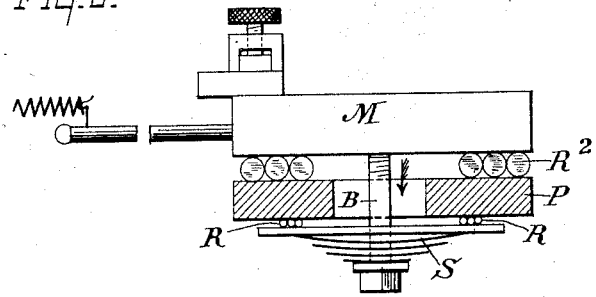

In the accompanying drawings, Figures 1 and 2 are cross-sections through clamp-slides and rests or beds for the same, and show constructions heretofore employed. Fig. 3 is a cross-section through a slide and rest constructed in accordance with my invention. Fig. 4 is an end elevation, and Fig. 5 a side elevation, of a preferred construction. Fig. 6 is a side elevation and partial section showing the application of part of my invention to a modified construction.

Referring to Figs. 1 and 2, M indicates the clamp-slide, and P the bed or rest on which it moves in electrical contact with such bed. The clamp-slide M bears the clamping devices and the piece of metal which is to be heated by the current, and the bed P is in the path of the electric current flowing to the slide. In order to preserve a good electrical connection between the bed and slide, clamps C C are ordinarily employed for the purpose of exerting a downward pressure on the clamp-slide.

T is the table by which the parts are carried. As will be seen, provision is also made for holding the clamp-slide against lateral movement. In order to obtain the highest conductivity possible, it is the practice to make the slides and clamps of copper, which not only would expand considerably with an increase of temperature, but also readily conducts heat from the clamp holding the work.

With the construction illustrated in Figs. 1 and 2, if the clamp-slide be loosely fitted, current will not pass from the clamp bed or seat to such slide with sufficient freedom, and if it be tightly fitted the clamp-slide may not be moved freely to follow up a readily-fusible material in the operation of welding. Moreover, it will frequently happen that after the first or second weld the clamp-slide will wedge in its guides and cannot be used further until cooled off. The construction illustrated in Fig. 1 is also a very expensive one and requires skillful labor. In order to overcome these objections, I form the slide and bed so that the slide shall rest thereon by a V-shaped bearing, as indicated in Fig. 3. The V-shaped groove in the bed-plate P may be readily made by the use of any ordinary planer.

One or more bolts or rods B extend down from the clamp-slide through the bed or rest P, and carry beneath the table T the rollers R R, which run upon the bottom of the table and are supported by one or more flat springs S, carried by rod B. The springs S serve to exert a downward pressure upon the clamp-slide, thus holding it firmly to its seat and making good connection with the bed or rest P. In this construction not only is there a large contact-surface which will perfect itself by wear, but moreover any expansion in the clamp-slide or rest therefor will only result in lifting the movable part in a direction opposite to the spring-pressure, while such expansion will be taken up by the spring S. It is also obvious that wedging of the movable clamp-slide in the stationary rest cannot take place and that good contact will be maintained under all conditions. The slide may be moved in its seat longitudinally by any of the devices employed in the art.

In delicate work it is necessary that the slide should move with the greatest freedom. In order to permit this, while at the same time not interfering with the free conduction of electricity from the rest to the slide, I interpose between the slide and its rest a number of copper rollers or balls $R^2$, as indicated in Figs. 4 and 5. The downward pressure is in this instance obtained by means of springs S' S', connected to rods which extend longitudinally from the clamp-slide M. The springs may be applied, as indicated, at an angle, so as to assist in moving the clamp-slide with the work toward the opposite clamp, and thereby to re-enforce the action of the spring $S^2$, acting in a direct horizontal line or line of movement of the clamp.

By means of the rollers or balls of copper between the clamp-slide and its seat I find that an electric current of great volume may be passed from the seat or bed P to the slide without any undue heating and without interfering with the free movement of the slide.

In Fig. 6 I have illustrated the application of the copper rollers or balls to a slide and bed or seat having flat opposing surfaces. The spring S, which holds the slide down, has interposed between it and the bed P friction-rolls R, as indicated. As the rolls R, Figs. 3 and 6, are not necessarily in the path of the electric current, they may be made of iron or other material. The rolls $R^2$ are of copper or other good conducting material.

While I have shown the rolls in Figs. 4 and 5 as consisting of rods, I do not limit myself to the employment of such form of roll, although I prefer to use it, since a larger conducting mass of rolls may be obtained in a given space between the slide and the rest.

What I claim as my invention is—

1. In an electric welding or metal-working apparatus, a slide supported on its rest or bed by a V-shaped bearing, said slide and bed being included in an electric circuit to the work, so that the electric current will pass through the bearing.

2. The combination, in an electric welding or metal-working apparatus, with a clamp-slide having a V-shaped bearing or bearings, of a downward-pressure spring, as and for the purpose described.

3. The combination, in an electric welding or metal-working apparatus, of a clamp-slide, a fixed bearing therefor, and interposed conducting-rolls of copper or other good conducting material, as and for the purpose described.

4. The combination, with the movable slide, in an electric welding or metal-working apparatus, of a downward-pressure spring carried beneath the slide and interposed rolls between such spring and the bed or table.

5. In an electric welding apparatus, a conducting-slide having a mechanical bearing and electrical contact or connection through V-shaped bearing-surfaces, as and for the purpose described.

6. The combination, in an electric welding or metal-working apparatus, with a V-shaped conducting-slide, of depending rod or rods and springs carried thereby for imparting a downward pressure.

7. The combination, in an electric welding and metal-working apparatus, of a conducting-slide supported on a seat or bed by a V-shaped bearing and having a rod or rods extending through such rest or bed for connection with springs for holding the slide in contact with the bed.

8. The combination, with the conducting-slide, in an electric welding or metal-working apparatus, of a conducting slide-rest on which the slide bears by a V-shaped bearing and interposed conducting cylindrical rods of copper, as and for the purpose described.

9. The combination, with a conducting-slide, in an electric welding or metal-working apparatus, of a V-shaped bearing for said slide and interposed roller-contacts, as and for the purpose described.

Signed at Lynn, in the county of Essex and State of Massachusetts, this 3d day of July, A. D. 1889.

HERMANN LEMP.

Witnesses:
JOHN TREGONING,
EINAR ROSMUSSER.